H. M. OWENS.
TIRE REMOVER AND REPLACER.
APPLICATION FILED JUNE 16, 1908.
933,106.
Patented Sept. 7, 1909.
4 SHEETS—SHEET 4.
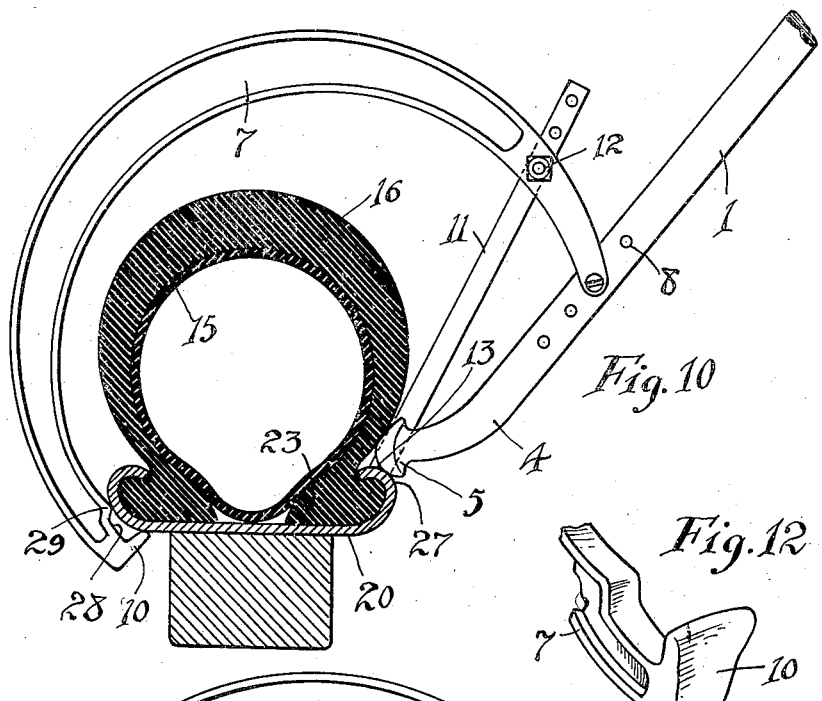
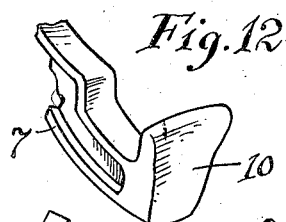
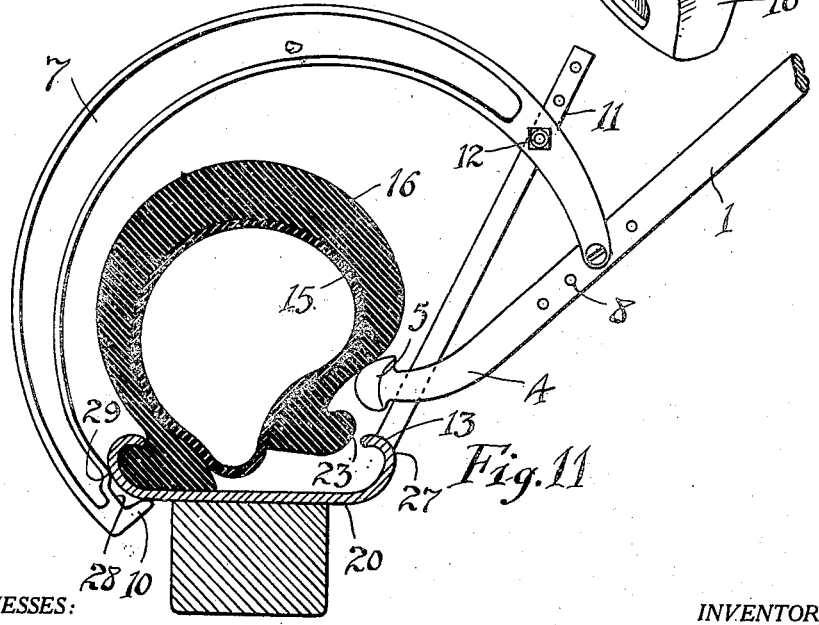
WITNESSES:
INVENTOR,
Henry M. Owens
BY
F. M. Wright,
ATTORNEY.

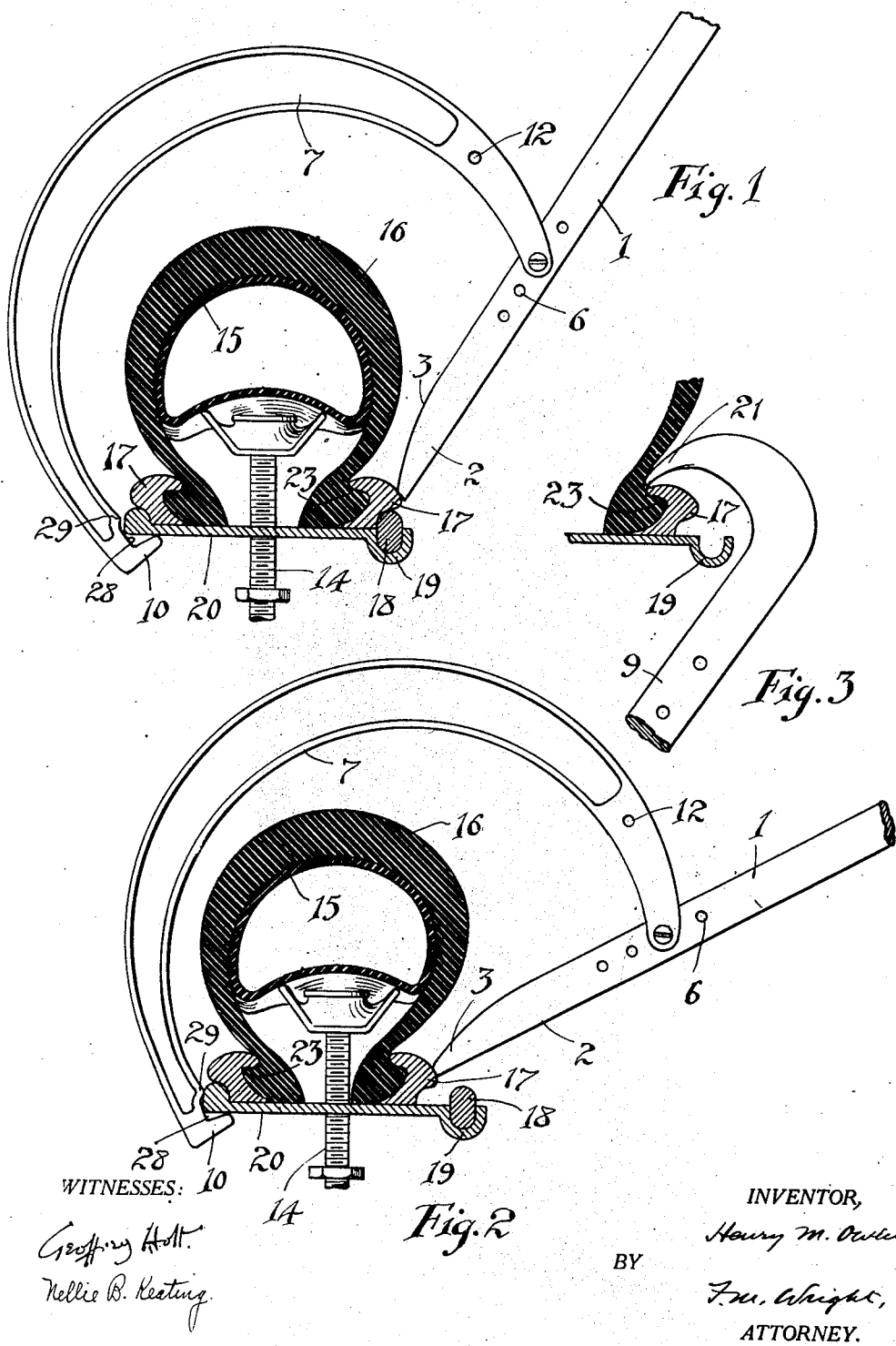

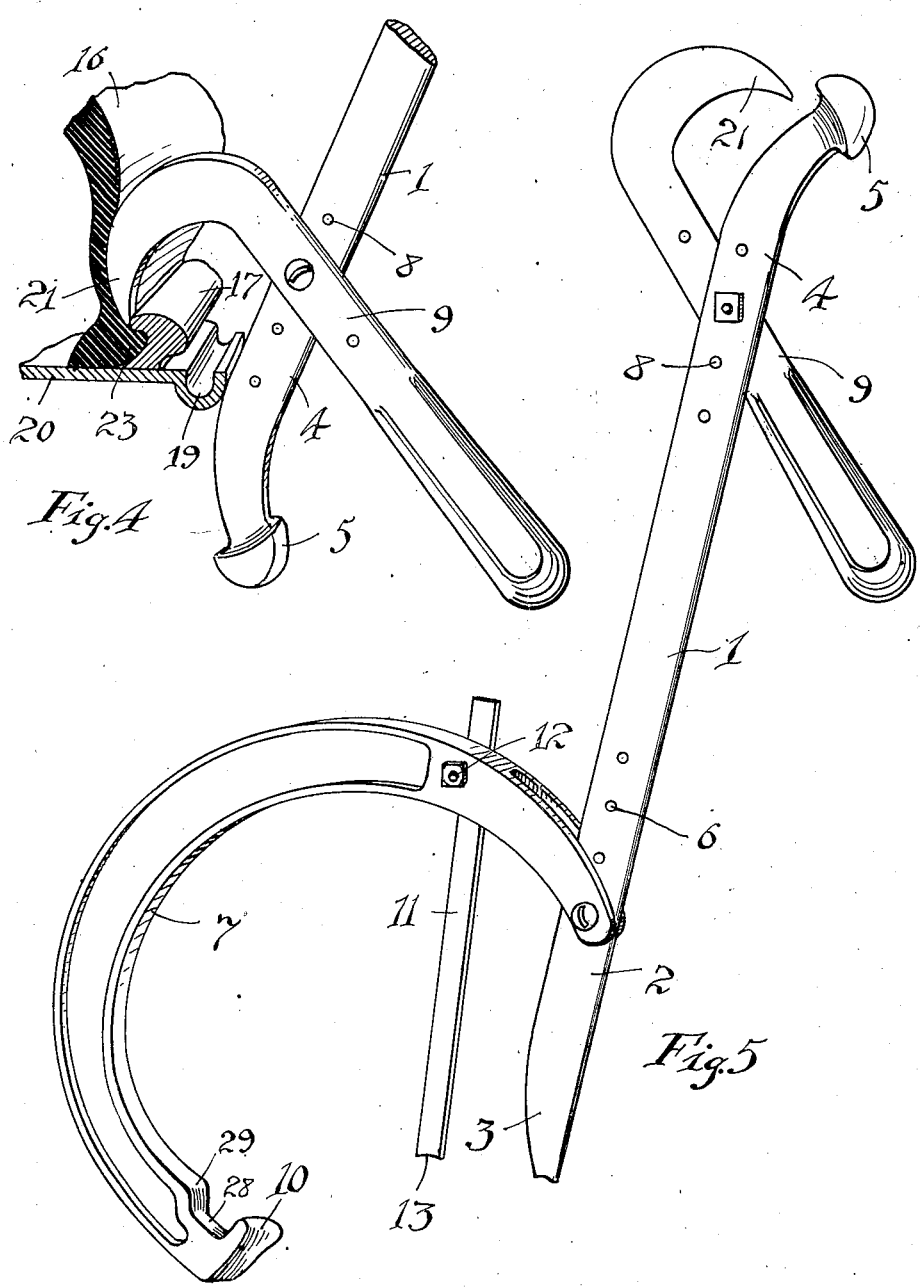

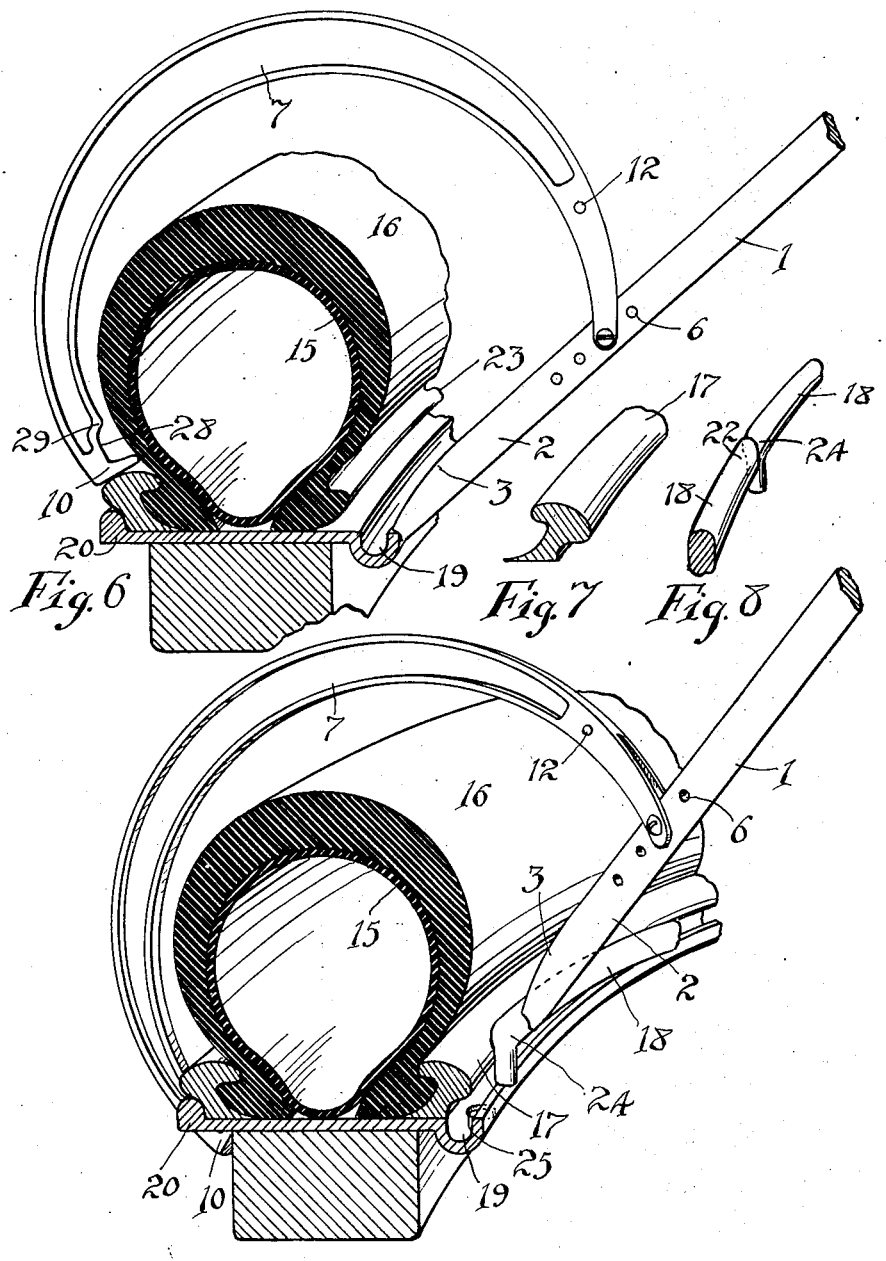

UNITED STATES PATENT OFFICE.

HENRY M. OWENS, OF SAN FRANCISCO, CALIFORNIA.

TIRE REMOVER AND REPLACER.

933,106.　　　　　Specification of Letters Patent.　　Patented Sept. 7, 1909.

Application filed June 16, 1908. Serial No. 438,814.

*To all whom it may concern:*

Be it known that I, HENRY M. OWENS, a citizen of the United States, residing at San Francisco, in the county of San Francisco and State of California, have invented new and useful Improvements in Tire Removers and Replacers, of which the following is a specification.

The object of the present invention is to provide a tool for rapidly and easily removing an automobile tire and replacing the same without the use of a hammer or other instrument, thereby avoiding the defacement of the rim of the wheel and the rings, the bruising of the tire casing, and the puncturing of the inner tube; one, moreover, which is adjustable, so that it can be used in tires of any size.

The implement is especially adapted for the quick removal of what is known as the Goodyear detachable tire, although it will be found of service for the removal of automobile tires in general.

In the accompanying drawing, Figure 1 shows in section the tire, and, in side view, a part of my improved implement applied thereto; Fig. 2 is a similar view showing the parts in another position; Fig. 3 is a broken view showing a part of the tire and a part of the implement applied thereto in another position; Fig. 4 is a broken side view showing the hook and lever applied to the inner ring; Fig. 5 is a perspective view of the entire device; Fig. 6 is a view similar to Figs. 1 and 2, but showing the parts at a later stage of removal; Fig. 7 is a broken detail view of one of the inner rings detached; Fig. 8 is a broken detail perspective view of the binding ring detached; Fig. 9 is a broken perspective view showing the implement applied for replacing the binding ring in position; Fig. 10 is a view similar to Fig. 1 showing the implement applied to remove a tire in a modified form of wheel; Fig. 11 is a similar view at a later stage; Fig. 12 is a broken view of an end of the curved hook.

Referring to the drawing, 1 indicates a hand lever, which is substantially straight for the great portion of its length, and near one end 2 is reduced in width, as shown at 3, said end 2 being concave to form a socket adapted to engage convex surfaces. Its other end 4 is bent at an angle with the general direction of the lever and is formed with an enlarged wedge-shaped head or knob 5, which, as shown in Figs. 10 and 11, may be conveniently applied to the tire for the purpose of detaching the same from the rim. Near the end 2, said lever is formed with a series of pivot holes 6, by any one of which is pivotally attached a curved hook 7, and near the other end 4 it is formed with a series of pivot holes 8 by any one of which is pivotally attached a short hooked lever 9. Said hook 7 is formed at its free end with an inwardly extending widened lip 10, which can be placed against the under side of the rim, or can be applied at the side of the casing. To said hook 7, near its pivoted end, a post 11 is pivotally secured by a pivot hole 12 in said post, the lower end of said post being concave, as shown at 13, to form a socket adapted to engage a rounded or convex surface. The free end of the hook 7 is formed just within the inwardly extending lip with a U-shaped notch 28, extending between said projection, and a shoulder 29 formed on the inner edge of said hook.

The mode of using this implement to remove and replace an automobile tire is as follows. The valve cap having been first detached, to allow the air to escape by the valve tube 14 from the inner rubber tube 15, so that said tube can collapse, permitting the casing 16 to become flexible, then the inner ring 17, on the outer side of the wheel, which lies next to the binding ring 18, must first be shifted inward, all around the tire, for the purpose of permitting said binding ring to be removed from the groove 19 in which it is contained. With this object, the inwardly extending blunt lip 10 at the end of the hook 7 is placed beneath the edge of the rim 20, at the inner side of the wheel, opposite to said binding wire, and the concave or socketed end 2 of the straight lever is placed against the inner ring 17 on the outer side of the wheel, as shown in Fig. 1. Then, by depressing the outer end of the lever 1, said inner ring 17 at that side is forced inward, as shown in Fig. 2. This operation is repeated at suitable distances apart all around the tire until the inner ring has been forced inward sufficiently not to obstruct the removal of the outer or binding ring 18 from its groove 19. The notch 28 and shoulder 29 are of considerable importance for the convenient operation of the implement at this stage, for thereby, in placing the implement in proper position for use, the notch is very easily fitted over the inner edge of the rim of the wheel, and, when in such position, the shoulder 29, pressing against the upper side of said edge, prevents the free side of the hook 7 slipping down, below said rim edge. Were this shoulder not provided, the pressure exerted upon the hand lever would have a tendency to draw the free edge of the hook 7 downward on account of the inclination of said edge to the direction of pressure between said edge and the rim. This would have the effect of forcing the inner edge of the hook 7 against the casing of the tire causing the casing to buckle, weakening the structural part of the casing; and interfering with the proper operation of the lever; also causing the casing to offer increased resistance to the inward pressure on the inner ring, so that, in effect, the lever would be working against itself. Moreover, such movement of the free end of the hook 7 would cause its extreme end to impinge against the side of the felly, abrading the same and removing the paint therefrom.

An important advantage arises from constructing the hook 7 of a semi-circular form, as distinguished from one having a comparatively small curved or arched portion, extended into a straight portion, the latter being pivoted to the hand lever. With the latter construction, it is impossible to apply the end of the hand lever to the inner ring, as shown in Fig. 1, but it can only be used by applying the side of said hand lever to the casing or other part which it is desired to move. If such a hook, of the old construction, is made sufficiently large to pass freely over the casing of the tire, out of contact therewith in all positions, then, on account of its being pivoted to the hand lever by means of a straight portion, said pivot will be at so great a distance from the end of the hand lever that the amount of leverage obtained will be unduly reduced, and sufficient power cannot be exerted by said hand lever. On the other hand, if it be attempted to pivot said hook 7 to the hand lever sufficiently close to the point of application of power to exert the required leverage, then, by reason of its form, said hook 7 will come in contact with the casing and its operation will be unduly interfered with. By making the hook in a complete semi-circle, it is possible to permit said hook to pass freely over, and out of contact with, the casing at all operative positions of the implement, while at the same time the pivot of the hook is sufficiently near the point of application of power to obtain a great leverage, thus enabling great power to be exerted by means of said implement.

It will be observed that the end of the hand lever which is applied to the inner ring, as shown in Fig. 1 is cut away or reduced in width, and this form is of great importance, for, if the lever were made of uniform width, up to the end, then, either the inner corner of the end of the lever would unduly press against the casing tending to injure the same, or the outer corner of the end of the lever would press against, and be stopped by the binding ring, thus preventing the end of the lever exerting any pressure on the inner ring to force it inward. By reducing the end of the hand lever to a width substantially the same as that of the surface of the inner ring exposed between the casing and the binding ring, said point can be applied to said inner ring to press it inward without exerting any pressure, either on the binding ring on the one side or on the casing on the other side. Said binding ring is then sprung outward, which can be conveniently done by placing the point 21 of the hooked lever 9 beneath the free end 22 of the binding ring, raising the same out of its groove, then passing said hook beneath said ring throughout its entire length. Said ring 18 is thus detached from the wheel.

It is now necessary to move the inner ring 17 outward from off the rim. For this purpose the short hooked lever 9 is employed, the point of the hook being applied, as shown in Fig. 3, between the inner ring 17 and the clencher portion 23 of the casing 16, so that, by turning said lever upward and to the right from the position shown in Fig. 3, the outer curved portion of the hook, pressing against the side of the casing, serves as a fulcrum, while the point of the hook is pressed against the inner lip of the ring 17 and forces said ring outward and away from the casing. This separation and detachment of the inner ring 17 can generally be accomplished by using the short hooked lever alone, but in case it should be impossible to draw out the inner ring by means of the hook 9 alone, the hook 9 can be used, as shown in Fig. 4, in conjunction with the hand lever to increase the power so applied to exert said pull, the edge of the lever below the pivot of the hook 9 being applied to the side of the rim and an outward pressure or pull being applied by the hand to the top of the hand lever. The power so applied, being increased manifold by the leverage, will always be sufficient to draw the inner ring outward.

The forcing inward of the inner ring 17 on the outer side for the purpose of removing the binding ring 18 will have also had the effect of loosening from the rim the clencher portion 23 of the outer side of the casing. To remove therefrom the clencher portion 23 of the inner side, the lip shaped end 10 of the hook 7 is placed against said inner side of the casing and the socketed end 2 of the hand lever is placed upon the side of the grooved portion 19 of the rim, and then, by pressing downward the outer end of the hand lever 1, a powerful leverage is exerted to draw the lip of the hook 7 outward or across the tire, thereby loosening the casing from the rim.

It will be observed that the shoulder 29 is in substantially the same circular arc as the extremity of the lip 10. In other words, the extremity of the lip is in the curve of the inner side of the hook 7 continued through said shoulder 29. Another advantage, therefore, arises from the above construction, namely, that said shoulder forms an additional point of pressure against the casing when removing the latter, so that as shown in Fig. 2, said pressure being applied at two points spaced apart, the danger of injuring the casing by applying too great a pressure at one point is eliminated.

When replacing the tire, the socketed end of the hand lever is placed against the hooked end 24 of the binding ring, while the lip of the hook 7 is placed beneath the inner edge of the rim 20, and then, by depressing the outer edge of the lever, said hooked end of the binding wire is forced inward so that its hook can drop into its hole 25 in the groove 19, and then, by applying the tool in like manner to the binding ring along its whole length, said ring can be moved into place.

Figs. 10 and 11 illustrate the application of the implement for loosening an automobile tire of another form. In this case, the hook 7 is detached from the end 2 of the hand lever, and is pivotally attached to the other end 4, and the socketed foot 13 of the post 11 is supported upon the curled edge 27 of the rim, while the headed end 5 of the lever 1 is applied to the side of the casing to press it inward and upward.

I claim:—

1. In a tire remover and replacer, a hand lever of which one terminal portion is reduced and terminates in a socketed end, and the other terminal portion is bent and terminates in an enlarged wedge-shaped head, said lever being formed with a pivot hole near each of its ends, and a curved hook provided with means for pivoting it in either of said holes, substantially as described.

2. In a tire remover and replacer, the combination of a hand lever, a hook substantially semi-circular in form arranged to surround the casing of a tire, one end of said hook being pivoted at a fixed point to the hand lever near one end of the latter and about an axis at right angles to the plane of said hook, the other end being adapted to engage the opposite edge of the rim of the wheel while the said end of the hand lever engages the nearer edge thereof and the hook surrounds the casing of the tire, said other end of the hook being formed on its inner side with a recess adapted to engage said farther edge, and with a lip on the outer side of said recess to engage the inner side of said edge and with a shoulder on the inner side of the recess to engage the outer side of said edge, substantially as described.

3. In a tire remover and replacer, a hand lever of which one terminal portion is reduced and terminates in a socketed end, and the other terminal portion is bent and terminates in an enlarged wedge-shaped head, said lever being formed with a pivot hole near each of its ends, and a curved hook provided with means for pivoting it in either of said holes, and about an axis at right angles to the plane of said hook, the other end being adapted to engage the opposite edge of the rim of the wheel while the said end of the hand lever engages the nearer edge thereof and the hook surrounds the casing of the tire, said other end of the hook being formed on its inner side with a recess adapted to engage said farther edge, and with a lip on the outer side of said recess to engage the inner side of said edge and with a shoulder on the inner side of the recess to engage the outer side of said edge, substantially as described.

In testimony whereof I have hereunto set my hand in the presence of two subscribing witnesses.

HENRY M. OWENS.

Witnesses:
F. M. WRIGHT,
D. B. RICHARDS.